(12) United States Patent
Liu et al.

(10) Patent No.: US 8,366,455 B1
(45) Date of Patent: Feb. 5, 2013

(54) BATTERY CONNECTOR

(75) Inventors: Zhu-Rui Liu, Guang-Dong (CN); Jui-Ming Chang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/239,450

(22) Filed: Sep. 22, 2011

(51) Int. Cl.
H01R 13/73 (2006.01)

(52) U.S. Cl. .................................. 439/74; 439/607.36

(58) Field of Classification Search ............. 439/607.36, 439/607.35, 607.54, 74, 607.4
See application file for complete search history.

(56) References Cited

U.S. PATENT DOCUMENTS

| 5,520,545 | A | * | 5/1996 | Sipe | ................................. | 439/65 |
| 5,588,844 | A | * | 12/1996 | Sipe | ................................. | 439/65 |
| 7,717,719 | B2 | * | 5/2010 | Miyazaki et al. | ................ | 439/74 |
| 2002/0086581 | A1 | * | 7/2002 | Chen et al. | ..................... | 439/607 |
| 2006/0063432 | A1 | * | 3/2006 | Chen | ............................. | 439/607 |

\* cited by examiner

Primary Examiner — Gary F. Paumen
(74) Attorney, Agent, or Firm — Cheng-Ju Chiang

(57) ABSTRACT

A battery connector includes a male connector and a female connector interconnecting a male and a female printed circuit boards. The male connector includes a male housing, a plurality of male terminals molded in the male housing and a male shielding shell mounted on the male housing. A bottom of the male housing protrudes downward to form an insertion portion. The female connector includes a female housing, a plurality of female terminals and a female shielding shell mounted under the female housing. The female housing defines a plurality of openings, and an insertion groove for receiving the insertion portion therein. Each female terminal has a female contact portion molded in the female housing and further exposed out from the opening. Each male terminal has a male contact portion projected beyond a front of the male housing for being pressed into the opening to contact with the female contact portion.

7 Claims, 4 Drawing Sheets

BATTERY CONNECTOR

BACKGROUND OF THE INVENTION

1. Field of the Invention

The present invention generally relates to a battery connector, and more particularly to a battery connector occupying a smaller space in a mobile phone.

2. The Related Art

With fast development of electronic industry, electronic products are renewed and improved continuously. Currently, it's a trend for the electronic products, such as mobile phones, to be developed towards a direction of having thinner and more miniaturized appearances. Accordingly, various electronic components used in the mobile phones are also requested thinner and more miniaturized.

In general, a conventional battery connector used in the mobile phone includes an insulating housing and a plurality of terminals. The insulating housing defines a plurality of terminal grooves arranged at regular intervals along a transverse direction. The terminals are received in the terminal grooves. The terminals are always connected between a printed circuit board of the mobile phone and a battery. However, the structures of the terminals are designed more and more complexly to assure a better electrical connection, and the battery connector described above always has a higher height.

SUMMARY OF THE INVENTION

An object of the present invention is to provide a battery connector adapted for electrically interconnecting a female and a male printed circuit boards. The battery connector includes a male connector adapted to be mounted to the male printed circuit board, and a female connector adapted to be mounted to the female printed circuit board, and engaged with the male connector. The male connector includes a male housing, a plurality of male terminals and a male shielding shell. A front portion of a bottom of the male housing protrudes downward to form an insertion portion. Each of the male terminals has a male base portion molded in the male housing. A rear end of the male base portion extends upward and then extends rearward to form a male soldering portion projected out from a rear of the male housing to be soldered on the male printed circuit board. A front end of the male base portion smoothly inclines downward and then is arched downward to form a male contact portion projected out from a front of the male housing. The male shielding shell is mounted on the male housing, and has a male base plate projected beyond the front of the male housing. The female connector includes a female housing, a plurality of female terminals and a female shielding shell. A front side of a top of the female housing defines a plurality of openings arranged at regular intervals. A rear side of the top of the female housing defines an insertion groove for receiving the insertion portion of the male housing therein. An insertion space is formed between a bottom of the male base plate and the top of the female housing. The male contact portion stretches in the insertion space and further into the corresponding opening. Each of the female terminals has a female contact portion molded in the female housing with a middle thereof exposed out from the opening to electrically contact with the male contact portion. A front end of the female contact portion is bent downward, and then extends forward to form a female soldering portion projected out from a front of the female housing to be soldered on the female printed circuit board. The female shielding shell is mounted under the female housing.

As described above, the insertion portion of the male housing is inserted in the insertion groove of the female housing to press the male contact portion downward into the corresponding opening so as to electrically contact with the middle of the female contact portion, so that effectively lowers a height of the battery connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
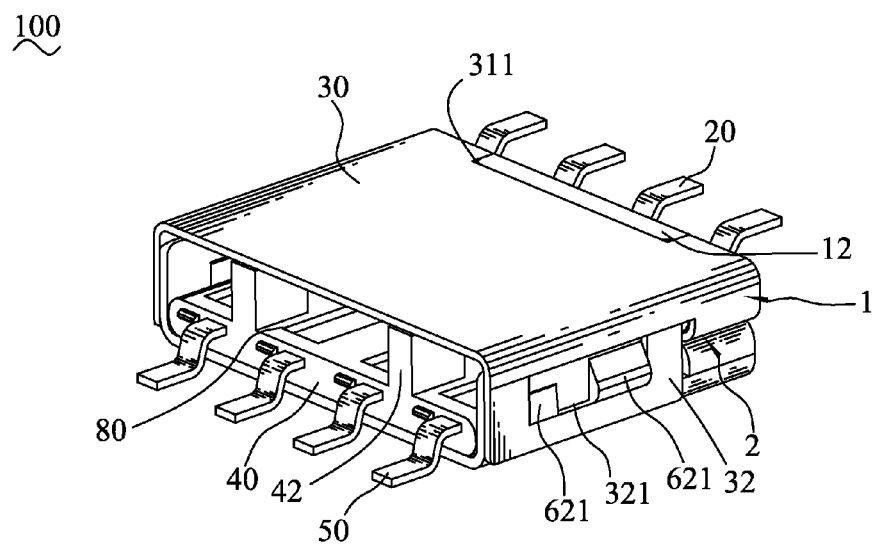
FIG. 1 is a perspective view of a battery connector in accordance with the present invention.
Figure 6:
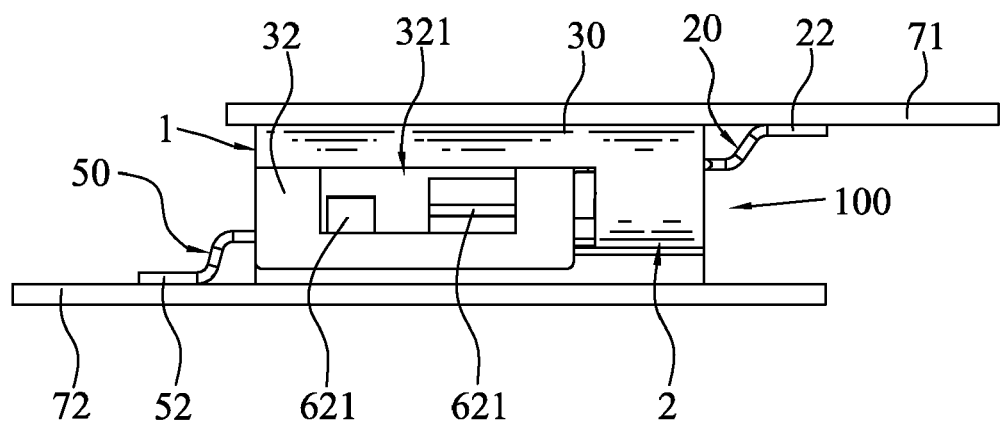
FIG. 6 is a lateral view of the battery connector of FIG. 1, which is soldered to a pair of spaced male and female printed circuit boards.

With reference to FIG. 1 and FIG. 6, a battery connector 100 of a board-to-board type in accordance with the present invention includes a male connector 1 and a female connector 2 which are soldered to a pair of spaced male printed circuit board 71 and female printed circuit board 72 to electrically interconnect the male and female printed circuit boards 71, 72.

Figure 3:
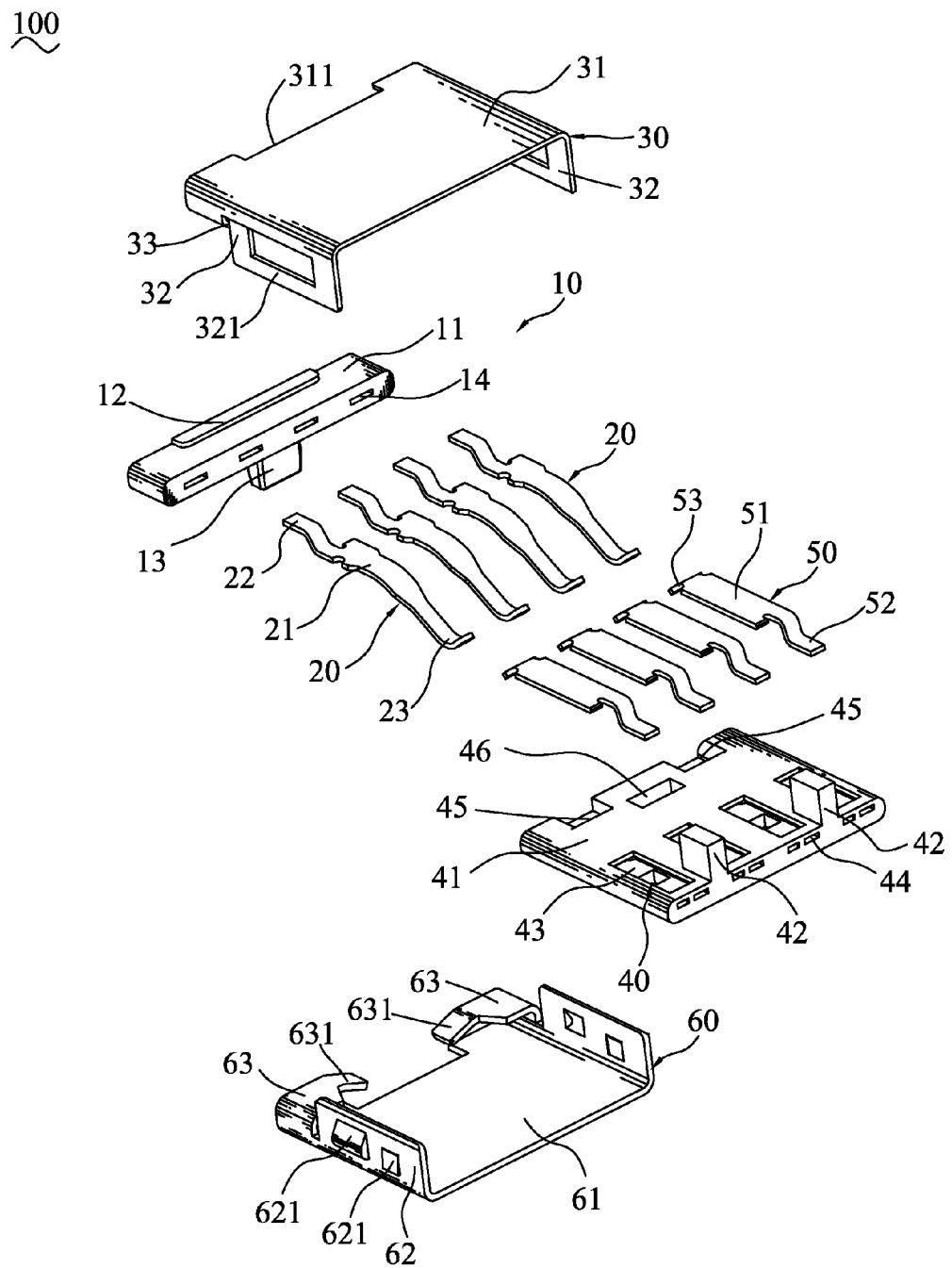
FIG. 3 is an exploded view of the battery connector of FIG. 1.
Figure 4:
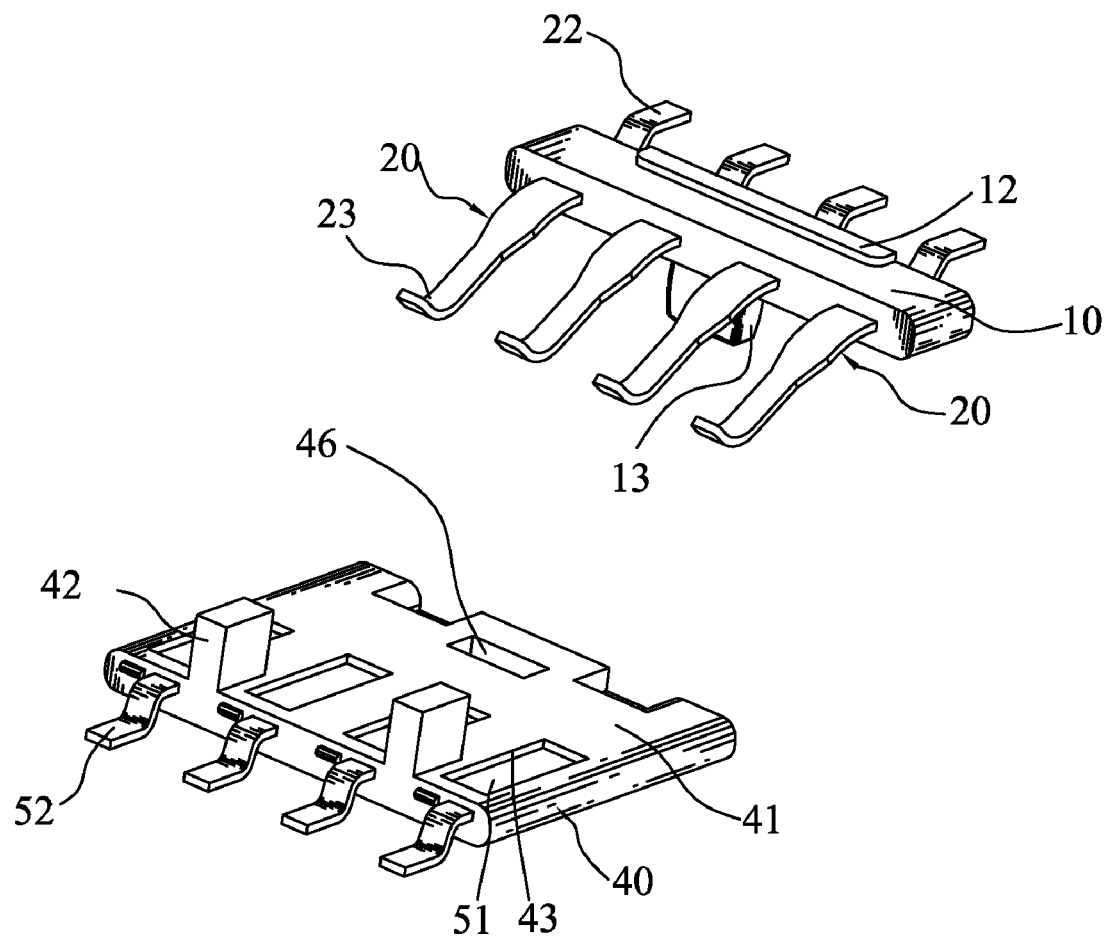
FIG. 4 is a partially exploded view of the battery connector of FIG. 1, wherein a male shielding shell and a female shielding shell are respectively disassembled from a male connector and a female connector of the battery connector.
Figure 5:
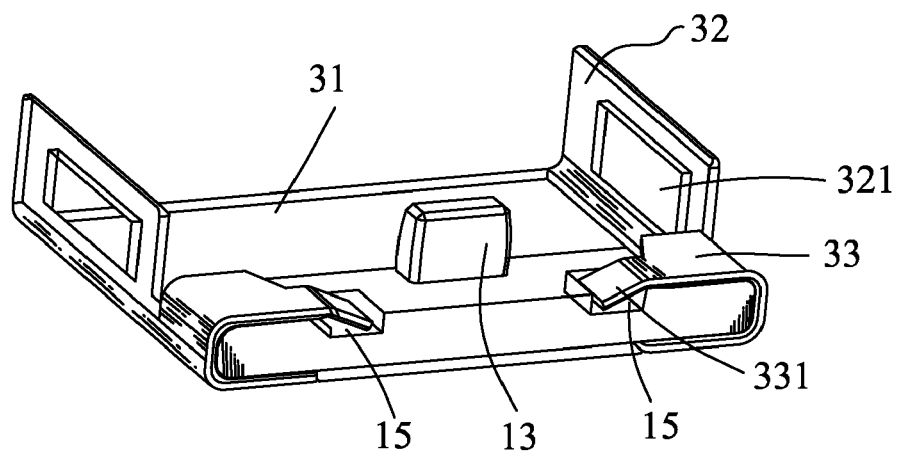
FIG. 5 is an assembly view of a male housing and the male shielding shell of the male connector of the battery connector of FIG. 1.

Referring to FIG. 3 and FIG. 5, the male connector 1 includes a male housing 10, a plurality of male terminals 20, and a male shielding shell 30. The male housing 10 has a rectangular base body 11. A front portion of a bottom of the base body 11 protrudes downward to form an insertion portion 13. The bottom of the base body 11 defines two male buckling grooves 15 spaced from each other and passing through a rear end of the bottom of the base body 11. A rear portion of a top of the base body 11 protrudes upward to form a fastening portion 12. The base body 11 defines a plurality of male terminal grooves 14 extending longitudinally to pass through a middle of the base body 11 from front to rear.

Referring to FIG. 3, each of the male terminals 20 has a male base portion 21. A side of a rear end of the male base portion 21 extends upward and then extends rearward to form a male soldering portion 22. A front end of the male base portion 21 smoothly inclines downward and then is arched downward to form a male contact portion 23.

Referring to FIG. 3 and FIG. 5 again, the male shielding shell 30 has a male base plate 31 of a rectangular shape. Two fronts of two opposite sides of the male base plate 31 extend downward to form two male lateral plates 32. Two rears of the two opposite sides of the male base plate 31 are bent inward to form two male bending portions 33. An outer portion of a free end of each male bending portion 33 extends towards the other male bending portion 33 and then inclines towards the male base plate 31 to form a male buckling portion 331. A rear side edge of the male base plate 31 is concaved inward to form a fastening groove 311. A middle of each male lateral plate 32 defines a rectangular fixing hole 321.

Referring to FIGS. 1-6, when the male connector 1 is assembled, the male base portions 21 of the male terminals 20 are integrally molded in the male terminal grooves 14 of the male housing 10 with the male contact portions 23 projected out from the front of the base body 11 and the male soldering portions 22 projected out from the rear of the base body 11 to be soldered on the male printed circuit board 71. The male shielding shell 30 is mounted on the male housing 10 with the fastening portion 12 being fastened in the fastening groove 311 and the two male buckling portions 331 being buckled in the male buckling grooves 15.

Figure 2:
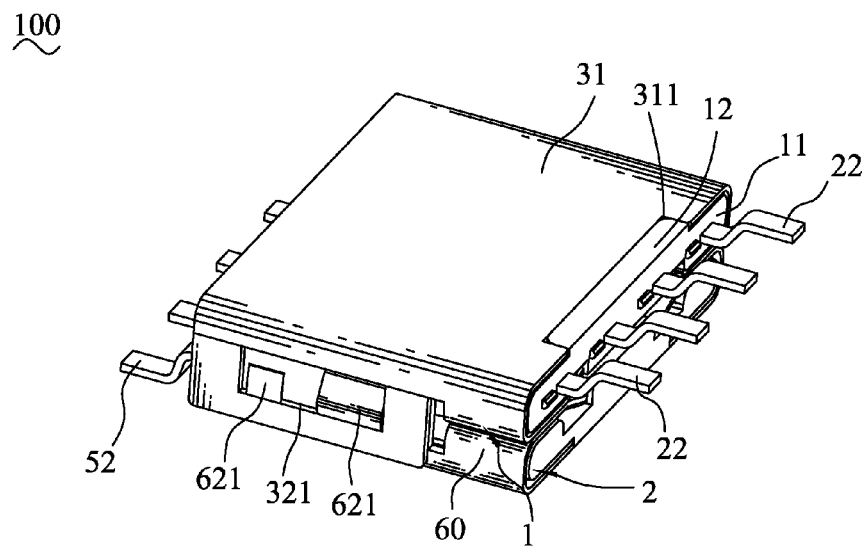
FIG. 2 is another perspective view of the battery connector of FIG. 1.

Referring to FIG. 2 and FIG. 3 again, the female connector 2 includes a female housing 40, a plurality of female terminals 50, and a female shielding shell 60. The female housing 40 has a main body 41 of a rectangular shape. Two portions of a front side of a top of the main body 41 protrude upward to form two propping portions 42 spaced from each other. The front side of the top of the main body 41 defines a plurality of openings 43 extending longitudinally and arranged at regular intervals along a transverse direction of the main body 41. The main body 41 defines a plurality of female terminal grooves 44 of which middles are connected with the openings 43 respectively. Each female terminal groove 44 extends longitudinally to penetrate through a front end of the main body 41. A rear side of the top of the main body 41 defines two female buckling grooves 45 passing through a rear end of the top of the main body 41 and spaced from each other, and an insertion groove 46 located in front of an interval of the two female buckling grooves 45.

Referring to FIG. 3, each of the female terminals 50 has a female contact portion 51. One side of a front end of the female contact portion 51 is bent downward, and then extends forward to form a female soldering portion 52. A rear end of the female contact portion 51 is bent downward to form a reinforced portion 53.

Referring to FIG. 3, the female shielding shell 60 has a rectangular female base plate 61. Two fronts of two opposite sides of the female base plate 61 extend upward to form two female lateral plates 62. Two rears of the two opposite sides of the female base plate 61 are bent inward to form two female bending portions 63. Two portions of an outer surface of each female lateral plate 62 protrude outward to form two fixing portions 621. An outer portion of a free end of each female bending portion 63 extends towards the other female bending portion 63 and then inclines towards the female base plate 61 to form a female buckling portion 631.

Referring to FIG. 1, FIG. 2, FIG. 3, FIG. 4 and FIG. 6, when the female connector 2 is assembled, the female terminals 50 are integrally molded in the female terminal grooves 44 of the female housing 40 with the female soldering portion 52 projected out from the front end of the main body 41 to be soldered on the female printed circuit board 72, and a substantial middle of the female contact portion 51 exposed out from the opening 43. The female shielding shell 60 is mounted under the female housing 40 with the female buckling portions 631 buckled in the female buckling grooves 45.

Referring to FIGS. 1-6, when the male connector 1 is engaged with the female connector 2, the insertion portion 13 of the male housing 10 is inserted in the insertion groove 46 of the female housing 40 to press the male contact portion 23 downward into the corresponding opening 43 so as to electrically contact with the middle of the female contact portion 51, so that effectively lowers a height of the battery connector 100. The male bending portions 33 of the male shielding shell 30 contact with the female bending portions 63 of the female shielding shell 60. The male lateral plates 32 are attached to the female lateral plates 62 to make the fixing portions 621 fixed in the fixing holes 321 so as to secure the male connector 1 and the female connector 2 together firmly. The propping portions 42 resist against a bottom of the male base plate 31 of the male shielding shell 30. An inserting space 80 is formed between the top of the main body 41 and the male base plate 31.

In use, a battery (not shown) is inserted into the inserting space 80 of the battery connector 100. The fixing portions 621 are fixed in the fixing holes 321 to make the male connector 1 and the female connector 2 interconnected with each other firmly so as to improve insertion and withdrawn force between the battery connector 100 and the battery. The male soldering portion 22 of the male terminal 20 of the male connector 1 and the female soldering portion 52 of the female terminal 50 of the female connector 2 are respectively soldered to the male printed circuit board 71 and the female printed circuit board 72 to realize an electrical connection between the male printed circuit board 71 and the female printed circuit board 72 therethrough.

As described above, the insertion portion 13 of the male housing 10 is inserted in the insertion groove 46 of the female housing 40 to press the male contact portion 23 downward into the corresponding opening 43 so as to electrically contact with the middle of the female contact portion 51, so that effectively lowers a height of the battery connector 100. Furthermore, the fixing portions 621 of the female shielding shell 60 are fixed in the fixing holes 321 of the male shielding shell 30 so that can make the male connector 1 and the female connector 2 interconnected with each other firmly to further improve insertion and withdrawn force between the battery connector 100 and the battery.

What is claimed is:

1. A battery connector adapted for electrically interconnecting a male and a female printed circuit boards, comprising:

a male connector adapted to be mounted to the male printed circuit board, the male connector having:
a male housing, a front portion of a bottom of the male housing protruding downward to form an insertion portion;
a plurality of male terminals of which each has a male base portion molded in the male housing, a rear end of the male base portion extending upward and then extending rearward to form a male soldering portion projected out from a rear of the male housing to be soldered on the male printed circuit board, a front end of the male base portion smoothly inclining downward and then being arched downward to form a male contact portion projected out from a front of the male housing; and
a male shielding shell mounted on the male housing, and having a male base plate projected beyond the front of the male housing; and a female connector adapted to be mounted to the female printed circuit board, and engaged with the male connector, the female connector having:
a female housing, a front side of a top of the female housing defining a plurality of openings arranged at regular intervals, a rear side of the top of the female housing defining an insertion groove for receiving the insertion portion of the male housing therein, an insertion space being formed between a bottom of the male base plate and the top of the female housing, the male contact portion stretching in the insertion space and further into the corresponding opening;

a plurality of female terminals of which each has a female contact portion molded in the female housing with a middle thereof exposed out from the opening to electrically contact with the male contact portion, a front end of the female contact portion being bent downward, and then extending forward to form a female soldering portion projected out from a front of the female housing to be soldered on the female printed circuit board; and a female shielding shell mounted under the female housing.

2. The battery connector as claimed in claim 1, wherein two fronts of two opposite sides of the male base plate extend downward to form two male lateral plates of which each defines a fixing hole, the female shielding shell has a female base plate, two fronts of two opposite sides of the female base plate extend upward to form two female lateral plates of which each defines a fixing portion fixed in the fixing hole.

3. The battery connector as claimed in claim 1, wherein the bottom of the male housing defines two male buckling grooves passing through a rear side thereof, two rears of two opposite sides of the male base plate are bent inward to form two male bending portions, a free end of each male bending portion extends towards the other male bending portion and then inclines towards the male base plate to form a male buckling portion buckled in the buckling groove.

4. The battery connector as claimed in claim 1, wherein a rear side edge of the male base plate is concaved inward to form a fastening groove, a rear portion of a top of the male housing protrudes upward to form a fastening portion fastened in the fastening groove.

5. The battery connector as claimed in claim 1, wherein a front side of a top of the female housing defines two propping portions resisting against the bottom of the male base plate.

6. The battery connector as claimed in claim 1, wherein the female shielding shell has a female base plate of which two rears of two opposite sides are bent inward to form two female bending portions, a free end of each female bending portion extends towards the other female bending portion and then inclines towards the female base plate to form a female buckling portion, a rear side of the top of the female housing defines two female buckling grooves for receiving the female buckling portions respectively.

7. The battery connector as claimed in claim 1, wherein a rear end of the female contact portion is bent downward to form a reinforced portion molded in the female housing.

\* \* \* \* \*